United States Patent [19]
Cheeseman

[11] Patent Number: 4,572,404
[45] Date of Patent: Feb. 25, 1986

[54] MECHANISM FOR CUP DISPENSER

[75] Inventor: Brian Cheeseman, St. Peter, England

[73] Assignee: Roboserve Limited, Perivale, England

[21] Appl. No.: 578,627

[22] Filed: Feb. 9, 1984

Related U.S. Application Data

[63] Continuation-in-part of Ser. No. 291,465, Aug. 10, 1981, abandoned.

[51] Int. Cl.⁴ .............................................. B65H 3/28
[52] U.S. Cl. .................................................. 221/223
[58] Field of Search ................. 221/221, 222, 223, 11, 221/75, 297, 298

[56] References Cited

U.S. PATENT DOCUMENTS 2,433,736 12/1947 Carew .................................. 221/222

Primary Examiner—Stanley H. Tollberg
Attorney, Agent, or Firm—Ivor M. Hughes

[57] ABSTRACT

A dispenser for dispensing cups one by one from a stack comprising a plurality of cams spaced about a first axis, coaxial with the axis of the stack of cups when present, drive means for rotating the cams together, each about an associated axis parallel with the first axis, each of the cams having a cam face which is a helix about its axis and is arranged to engage the rim of the end cup of a stack of cups located in the dispenser so that rotation of the cams in one direction pushes the end cup away from the remainder of the stack to dispense it, the spiral angle of the helix of the cam being in the range of about 8 degrees to about 14 degrees, and in which the cam face of each cam is chamfered with respect to any diameter of the cam, with the angle of chamfer of the cam face through its entire length in the range of substantially 22 degrees to substantially 28 degrees.

10 Claims, 5 Drawing Figures

MECHANISM FOR CUP DISPENSER

FIELD OF INVENTION

This application is a continuation-in-part application of U.S. patent application Ser. No. 291465 filed Aug. 10, 1981 (now abandoned). This invention relates to a cup dispenser particularly for dispensing foam cups singly from a stack of cups which will normally be a vertical stack.

BACKGROUND OF THE INVENTION

Because of the constraints of space in a dispenser used for dispensing cups, the dimensions of the components making up the dispenser must be minimized both as to size and number. Additionally, the movements of the components must be minimized.

One such dispenser comprises a plurality of cams spaced about a first axis (coaxial with the axis of the stack of cups) and drive means for rotating the cams together, each about an associated axis parallel to the first axis. A connector, for example, a gear carrying a handle, connects the cams to the drive means for rotating the cams.

Each of the cams has a cam face which cam face is a helix about its axis and is arranged to engage the rim of the end cup of a stack of cups located in the dispenser so that rotation of the handle through an angle of about 10 degrees, rotates the cams in one direction pushing the end cup away from the remainder of the stack dispensing the cup. The handle is then returned through the same arc to its initial position readying the cam for dispensing the next cup.

Where such dispenser has been tried for use to dispense foam cups, the dispenser of a construction as used to dispense conventional paper or thermofoamed plastic cups is not satisfactory.

Particularly, the rotation of the handle through the small arc (about 10 degrees) must be sufficient to cause the foam cup to be dispensed. Therefore, the helical angle of the cam face of the cam (which cam face is a helix about the cam's axis) must be such as to eject the engaged foam cup. If the helical angle of the dispensing cam face is too steep, the foam cup will be crushed. If the helical angle is too shallow, the resultant structure of the cam would be too large for the dispenser size required.

Conventionally the dispensing cam face is downwardly facing, and in the direction of any diameter, is normal to the axis of rotation of the cam. This disposition of the cam face however, is not satisfactory for use in dispensing foam cups. Particularly, this cam face does not provide a satisfactory dispensing action, tending to dig into the rim of the cup and scoring the rim, by a point contact between the cup rim and cam face when the cam face engages the rim, seriously damaging the cup.

It is thought that for minimizing scoring, contact of the cam face and the rim of the cup must be maximized. In this regard, the optimum shape of the cam face would be that of the rim of the cup it would be engaging (curved). However, the manufacture of such curved face on the cam would be very difficult to achieve—the die could not be separated from the injection moulded part, undercutting the curve in the cam face, damaging it.

It is therefore an object of this invention to provide a cam profile which provides a more satisfactory dispensing action and minimizes damage to the rim of a cup being dispensed.

Further and other objects of this invention will be realized by those skilled in the art from the following summary of the invention and detailed description of an embodiment.

SUMMARY OF INVENTION

Unexpectedly, a dispenser for dispensing foam cups one by one from a stack of cups, comprising a plurality of cams spaced about a first axis, coaxial with the axis of the stack of cups when present, drive means for rotating the cams together, each about an associated axis parallel to the first axis, each of the cams having a cam face which is a helix about its axis and is arranged to engage the rim of the end cup of a stack of cups located in the dispenser so that rotation of the cams in one direction pushes the end cup away from the remainder of the stack to dispense it, the spiral angle of the helix being in the range of about 8 to 14 degrees, and in which the cam face of each cam is chanfered with respect to any diameter of the cam with the angle of the cam face chanfer through its entire length in the range of substantially 22 degrees to substantially 28 degrees achieves a satisfactory dispenser overcoming the problems of the prior art. Preferably the angle of chamfer is substantially 25 degrees.

Preferably each cam also has an upwardly facing cam surface for engaging the next cup in the stack and holding up the stack as the lowermost cup is dispensed. Preferably this upwardly directed cam face is also chamfered with respect to any diameter, preferably the chamfer angle being in the range of 19 degrees to 26 degrees and with advantage substantially 22½ degrees.

The spiral angle of the helix of the dispensing cam face preferably in the range of 10 degrees to 12 degrees and with advantage substantially 11 degrees. The effective length of the cam face extends through at least 270 degrees around the cam and with advantage through over 300 degrees.

One embodiment of the cup dispenser will now be described by way of example only, with reference to the accompanying drawings.

DESCRIPTION OF THE PREFERRED EMBODIMENTS OF THE INVENTION

Figure 1:
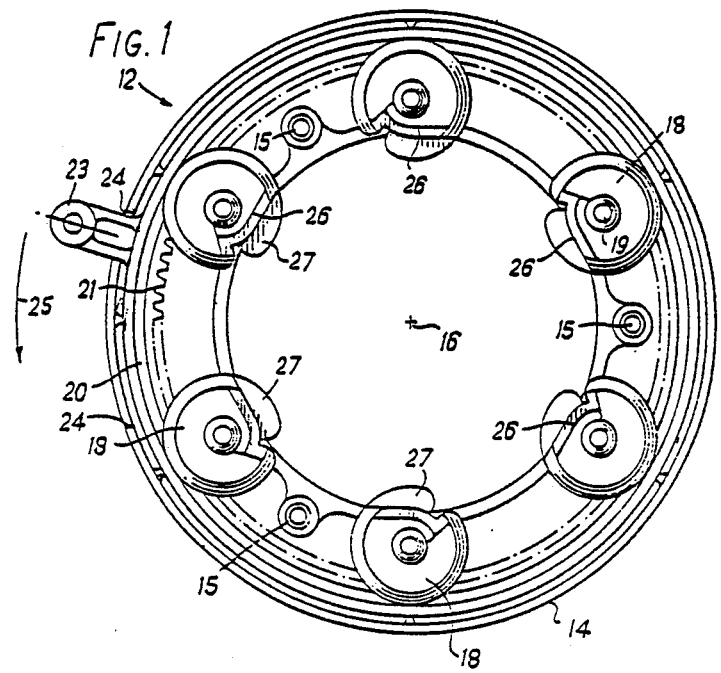
FIG. 1 is a plan view with the top half of the casing removed.
Figure 2:
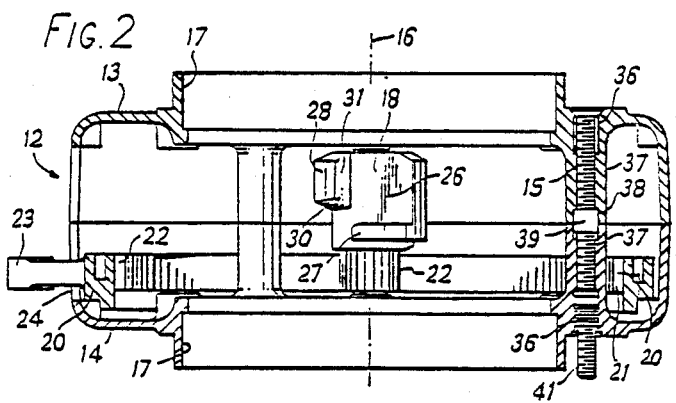
FIG. 2 is an axial section on the line II—II of FIG. 1, but with top half of the casing shown.
Figure 4:
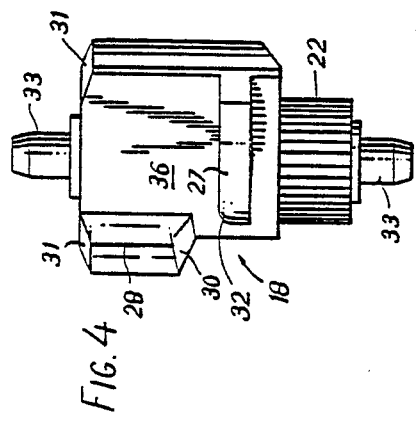
FIG. 4 is a side view of one cam of the dispenser.

The dispenser has a hollow casing 12 having identical upper and lower halves 13 and 14 respectively, connected together by three equi-distantly spaced bolts 15. The dispenser has a vertical axis 16 and its top and bottom are effectively open and define coaxial bores 17 to locate a cup stacking tube (not shown) at the top and an outlet guide tube (not shown) at the bottom. Six cams 18 are mounted in the casing equi-angularly spaced about the axis 16, the cams being angularly oscillatable about their own axes 19 by means of a common ring gear 20. The ring gear 20 is formed on its inner periphery with teeth 21 which engage a pinion gear portion 22 of each of the cams. The ring gear 20 has an operating handle 23 which projects through an aperture 24 in the casing and by means of which the ring gear can be reciprocated through an angle of 30 degrees as indicated by the arrow 25. The ring gear is shown in one extreme position, the rest position, in FIG. 1 in which a flat upright surface 26 of each cam faces inwardly and surfaces 26 form together a hexagon and a support member 27 of each cam projects into the central space of the dispenser and engages under the lip of the lowermost cup to hold up the stack.

Each cam has a cam projection 28 around its surface, the cam projection 28 having a helically formed downwardly facing dispensing surface 30 and an upwardly facing surface 31. These surfaces are both chamfered at an angle to any diameter of the cam, in this example, the lower cam face 30 making an angle of 25 degrees with such diameter and the upper cam face making an angle of 22½ degrees with such diameter.

Figure 3:
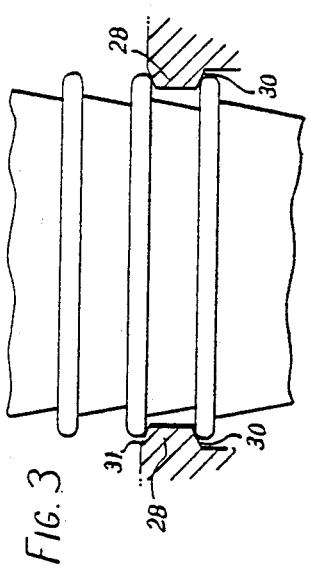
FIG. 3 is a view showing some cups of a stack engaged by two cam projections.
Figure 5:
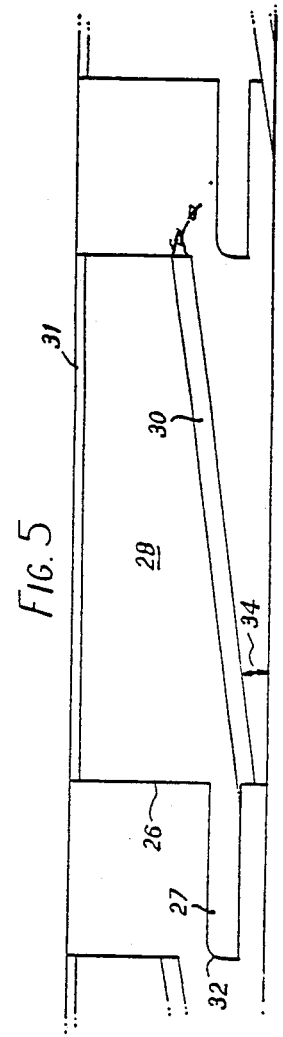
FIG. 5 is a development view of the cam of FIG. 3 on an enlarged scale.

As the operating handle 23 is moved from the rest position shown in FIG. 1, the cams are rotated together to enter the cam projections between the lips of the lowermost cup and the second lowermost cup as best seen in FIG. 3. The cups are made of expanded polystyrene. Further rotation of the cams pushes the lowermost cup downwardly away from the stack due to the helical form while the upper faces 31 continue to support the stack. The operating handle is then reciprocated back to its rest position in which the cam projections do not engage the cups which are supported on the members 27. The end of each member 27 is radiused as indicated at 32. As best seen in FIG. 5, the spiral angle of the helix indicated at 34 is 11 degrees.

Each of the halves of the casing are formed with six recesses and aligned pairs of recesses form bearing seats for the opposite projecting shaft portions 33 of the cams.

For receiving the bolts 15, the halves of the casing are each formed with a countersunk bore 36 opening to the outer (that is the upper or lower) surface, extending inwardly to a counter bore 37 of smaller diameter which in turn opens to the inner surface via a further bore 38 of diameter greater than bore 37. A ring dowel 40 is located in aligned mating bores 38 and through this the bolt 15 passes. Each bolt can be inserted from either the top or bottom with its head located in one of the bores 36 and a threaded member 40 located in the other bore 36 for mating with the bolt. The end 41 of the bolt then projects beyond one bore 36 and can be used for mounting the dispenser on its machine chassis or wall brackets.

This arrangement allows the two casing halves to be made in the same mold and eliminates the need for separate fixing means to mount the dispenser. It allows the dispenser to be mounted either to an upwardly or a downwardly facing surface.

As many changes could be made to the invention without departing from the scope thereof, it is intended that all matter contained herein be interpreted as illustrative of the invention and not in a limiting sense.

The embodiments of the invention in which an exclusive property or privilege is claimed are as follows:

1. A dispenser for dispensing cups one by one from a stack comprising a plurality of cams spaced about a first axis, coaxial with the axis of the stack of cups when present, drive means for rotating the cams together, each about an associated axis parallel with the first axis, each of the cams having a cam face which is a helix about its axis and is arranged to engage the rim of the end cup of a stack of cups located in the dispenser so that rotation of the cams in one direction pushes the end cup away from the remainder of the stack to dispense it, the spiral angle of the helix of the cam being in the range of about 8 degrees to about 14 degrees, and in which the cam face of each cam is chamfered with respect to any diameter of the cam, with the angle of chamfer of the cam face through its entire length in the range of substantially 22 degrees to substantially 28 degrees.

2. A dispenser according to claim 1 in which the angle of chamfer is 25 degrees.

3. A dispenser according to claim 1 in which the oppositely facing cam surface, for engaging the next cup in the stack as the end cup is dispensed, is chamfered with respect to any diameter, at an angle in the range 19 degrees to 26 degrees.

4. A dispenser according to claim 3 in which the angle of chamfer of each of the oppositely facing cam surfaces is 22½ degrees.

5. A dispenser according to claim 1 in which the spiral angle of the helix of each cam face is in the range of 10 degrees to 12 degrees.

6. A dispenser according to claim 5 in which the spiral angle is substantially 11 degrees.

7. A dispenser according to claim 1, 2 or 3, in which the effective length of the cam face of each cam extends through at least 270 degrees around the cam.

8. A dispenser according to claim 4, 5 or 6 in which the effective length of the cam face of each cam extends through at least 270 degrees around the cam.

9. A dispenser according to claim 1, 2 or 3, in which said effective length of the cam face of each cam extends through over 300 degrees around the cam.

10. A dispenser according to claim 4, 5 or 6, in which said effective length of the cam face of each cam extends through over 300 degrees around the cam.

* * * * *